United States Patent [19]

Hahn, Jr. et al.

[11] Patent Number: 4,900,592

[45] Date of Patent: Feb. 13, 1990

[54] ION-EXCHANGED, CROSSLINKING LATEX PAINTS

[75] Inventors: Kenneth G. Hahn, Jr., Hinckley; Gary P. Craun, Berea, both of Ohio

[73] Assignee: The Glidden Company, Cleveland, Ohio

[21] Appl. No.: 306,680

[22] Filed: Feb. 6, 1989

[51] Int. Cl.[4] .......................... B05D 7/24; B05D 7/26
[52] U.S. Cl. ............................... 427/375; 427/385.5; 523/310
[58] Field of Search ............. 523/310; 427/375, 385.5; 524/833

[56] References Cited

U.S. PATENT DOCUMENTS 4,789,694 12/1988 Hahn, Jr. ........................... 523/310
4,812,491 3/1989 Hahn, Jr. ........................... 523/310

Primary Examiner—Joseph L. Schofer
Assistant Examiner—John J. Guarriello
Attorney, Agent, or Firm—Thomas M. Schmitz

[57] ABSTRACT

An aqueous thermosetting protective coating composition cures by water evaporation followed by thermosetting crosslinking of the polymeric binder. The polymeric binder is ion-exchanged to remove cations and reduce the pH to less than 2.5 and comprises copolymerized ethylenic monomers including a beta-hydroxy ester monomer, whereby the polymer is self-curing by crosslinking by transesterification through hydroxy groups and beta-ester groups.

5 Claims, No Drawings

ION-EXCHANGED, CROSSLINKING LATEX PAINTS

BACKGROUND OF THE INVENTION

This invention relates to commonly assigned Ser. No. 157,256 filed Feb. 18, 1988, now U.S. Pat. No. 4,812,491 and Ser. No. 100,537 filed Sept. 24, 1987, now U.S. Pat. No. 4,789,694 which are incorporated herein by reference. In said Ser. No. 100,537, reactive emulsion polymers treated by ion-exchange are crosslinked with glycoluril. Said Ser. No. 157,256 pertains to self-curing ion-exchange treated latexes containing copolymerized monomers including carboxyl and hydroxyl monomers in combination with alkylol acrylamide monomer to provide a self-curing thermosetting latex.

This invention relates to protective surface coatings and more particularly to paint coatings containing a thermosetting polymeric binder based on an ion-exchange treated, thermosetting functional latex polymer. The functional latex polymer comprises emulsion polymerized ethylenic monomers including a beta hydroxy ester monomer, but specifically excluding amine monomers, to produce a functional latex. The functional latex is then treated in an ion-exchange process to produce a low pH functional latex adapted to self-crosslink by transesterification with respective beta-hydroxy ester groups in the latex polymer.

With respect to prior art, several patents disclose the use of acids, bases, metal salts, and organic metal complexes as catalysts for transesterifying polymers such as U.S. Pat. Nos. 4,362,847; 4,376,848; 4,332,7811; and U.S. Pat. No. 4,459,393 wherein octoates or naphthenates of lead, zinc, calcium, barium, and iron are disclosed as transesterification catalysts.

Dante and Parry have shown that phosphonium halides, such as ethyltriphenyl phosphonium iodide, are efficient catalysts for (a) 1,2-epoxide reactions with phenols to yield hydroxyl ethers (U.S. Pat. No. 3,477,990), and (b) polyepoxide reactions with carboxylic acids or acid anhydrides (U.S. Pat. No. 3,547,885). The patents suggest that polyepoxides and phenols can be reacted to form phenolic hydroxyl ethers with phosphonium salts as catalysts. The counterion of the phosphonium moiety is the anion portion of a carboxylic acid, or acid ester, such as in ethyltriphenyl phosphonium acetate (U.S. Pat. No. 3,948,855).

Barnhoorn et al (U.S. Pat. No. 4,459,393) teach self-crosslinking thermosetting resin compositions obtained from the reaction of a beta-hydroxylalkyl ester of an alpha, beta-carboxylic acid with a primary mono- or polyamine to give a product having 1 to 2 amino hydrogens and further reacted with a polyglycidyl ether of a polyhydric phenol so that the final resin adduct has more than one betahydroxyalkyl ester group and amine groups having 1 to 2 amine hydrogen atoms per molecule. Transesterification catalysts known in the art are taught.

Subamanyam et al (U.S. Pat. No. 4,376,848) teach the preparation of water dilutable electrocoating compositions having tertiary amino-containing basic binders by reacting a secondary amino group compound with an olefinically doublebonded epoxy and the copolymerization of this product with at least one ethylenically bonded polymerizable monomer wherein said binders can self-cure and be cured in combination with amine resins and/or phenolic resins. Common transesterification catalysts are taught.

Velko patents disclose resinous compositions curable through a transesterification curing mechanism based on conventional heavy metal catalysts. For instance, U.S. Pat. No. 4,423,167 discloses a polymeric polyol adapted to be crosslinked with a polyester having at least two beta-alkoxyester groups in the presence of conventional transesterification catalysts. Similarly, U.S. Pat. No. 4,489,182 is based on a crosslinking agent having at least two delta-hydroxy ester groups, while U.S. Pat. No. 4,423,169 is based on a crosslinking agent at least two beta- and/or gammaester groups, and U.S. Pat. No. 4,423,168 is based on a crosslinking agent having at least two beta-amide ester groups. The Velko patents utilize as catalysts organic salts of conventional heavy metal catalysts such as lead, zinc, iron, tin and manganese.

It now has been found that substantially odor free, ambient room temperature or heat-cured thermosetting consumer latex paints can be produced and cured by the internal reaction of beta-hydroxy ester functional latex binders. In accordance with this invention, the functional latex is ion exchanged to obtain a low pH, preferably below 2.5, to provide an acid activated thermosetting latex that can be heat cured or ambient cured without external crosslinking agents. It has been found that ambient dry consumer trade sales latex paint compositions (wall and ceiling paints, etc.) can be formulated to produce highly desired air dry films which further crosslink over a period of time to produce substantially improved film integrity properties. Ambient room temperature ordinarily is considered to be about 25° C. plus/minus 50° C., although higher/lower application temperatures are encountered with consumer paints. Prior to this invention, conventional air drying consumer paints dried by evaporation of water and subsequent coalescence of binder polymer particles, but such binders were merely coalesced and to crosslinked. In accordance with this invention, the binder polymer particles coalesce but then further crosslink at ambient room temperature or heat cured without the need for conventional crosslinkers such as melamine, glycoluril or methylol amide monomers in the latex. Elimination of melamine crosslinkers for instance substantially reduces or eliminates undesirable formaldehyde emissions. Instead, the functional latex polymer of this invention can be applied at room temperature, air dried for a few days to remove water, and then become crosslinked. Room temperature cured consumer paints exhibit excellent film formation by air drying but subsequently crosslink at ambient room temperature to form a cured thermoset paint film exhibiting superior film integrity properties.

In accordance with the process of this invention, an ambient or moderately heat curable latex paint free of melamine or glycoluril-type crosslinkers can be produced by emulsion copolymerization of ethylenic monomers using conventional surfactants and subjecting the resulting latex polymer to a cationic exchange treatment to remove the cations from the anionic surfactant as well as from other sources. The emulsion binder polymer is substantially free of amine groups since amine groups block reactivity, inhibit the cure and render the ionic exchange process of this invention inoperative. The resulting cationic exchange step produces an emulsion polymer adapted to cure at room temperature without the addition of acid catalysts such a p-toluenesulfonic acid. Hence, the disadvantages associated with the use of external acid catalysts are overcome by this invention. It is believed that the ambient cure achieved through ion exchange provides a low pH (acidic) system which activates crosslinking upon evaporation of water from the applied paint film. The thermosetting reaction occurring during the transesterification cure of the beta-hydroxy addition polymer (latex) is an acidic catalyzed coreaction of a beta-hydroxy ester group with another betahydroxy ester group. This invention is based on introducing acid catalysis into the polymeric mixture by ion-exchanging the beta-hydroxy ester latex polymer until the pH thereof is very acidic and preferably below 2.5 which avoids the addition of undesirable external acid catalysts.

Pigmented or clear paint mixtures exhibit excellent uninhibited cure along with long-term viscosity stability. The ion-exchange process utilizes a proton-substituted cation exchange resin to remove cations and unexpectedly yields an ambient cure liquid coating with long term package stability. Package stability is also improved, due to the absence of acid-sensitive formaldehyde crosslinking compounds. The cation exchange treatment of the thermosetting latex provides stability against settling and flocculation. The improved clear or pigmented emulsion coatings of this invention are indefinitely stable at room temperature and, upon drying, thermoset at room temperature to give a fully crosslinked film. These and other advantages of the invention will become more apparent by referring to the specification and illustrative examples.

SUMMARY OF THE INVENTION

Briefly, the invention pertains to a stabilized, air-drying, thermosetting coating based on a functionally, reactive emulsion polymer of copolymerized ethylenically unsaturated monomers including a beta-hydroxy ester monomer, but substantially free of amine monomers, where the thermosetting polymer is subsequently treated with an ion exchange step to reduce the pH to below about 3 and preferably below 2.5. The coating can be clear, but preferably is pigmented, and can be air-dried and thermoset at ambient room temperatures or with moderate heat by crosslinking through the beta hydroxy ester groups by transesterification. The thermosetting polymeric binder composition comprises by weight 100% of the amine-free, beta-hydroxy ester addition polymer (latex).

DETAILED DESCRIPTION OF THE INVENTION

In accordance with this invention, the polymeric binder composition for protective surface coatings comprises reacting beta-hydroxy ester functional emulsion polymers (latex) adapted to be self-crosslinking by transesterification between beta hydroxy ester groups on various latex polymeric chains.

Referring first to the self-curing addition copolymer, hydroxyl and ester groups in the form of a beta-hydroxy ester group are introduced into the copolymer by emulsion copolymerizing ethylenically unsaturated monomers including a beta-hydroxy ester monomer along with other ethylenic monomers where the inclusion of acrylic monomer is preferred. Referring first to the betahydroxy ester monomer components, a beta hydroxy ester monomer is an ethylenically unsaturated monomer generally containing the theoretical betahydroxy ester chemical structure as follows:

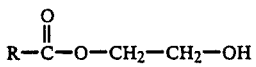

where the hydroxyl group is attached to the second (beta) carbon atom relative to the ester group and R is an alkyl chain containing terminal ethylenic carbon-to-carbon unsaturation. Any one of the hydrogens on the alpha or beta carbons can be substituted with a methyl group or similar short chain alkyl group. It is hypothesized that the ester group can form a loose six-membered, hydrogen bonding ring with the beta-hydroxyl group, which is known to weaken the betaester group and provide a weak ester bond to facilitate cleavage of the ester group by transesterification in accordance with this invention. Other beta-hydroxy ester groups in the same polymeric structure can function as a hydroxyl component which transesterifies with the weakened beta-ester group to form a transesterification crosslink between the beta ester and the beta hydroxyl groups of different beta-hydroxyl ester groups on the same acrylic polymer. Suitable beta hydroxy monomers can be produced by reacting an acrylic or methacrylic acid with ethylene oxide or propylene oxide to produce the beta-hydroxy ester structure in conjunction with an ethylenically unsaturated double bond. Beta-hydroxylate ester monomers include hydroxyl alkyl acrylates such as 2-hydroxy ethyl acrylate and methacrylate, 2-hydroxypropyl acrylate and methacrylate, and similar hydroxyl alkyl acrylates.

Beta-hydroxyl ester addition polymers, and particularly preferred acrylic copolymers, provide both the ester function and hydroxyl function for the transesterification cure. Acrylic copolymers are produced by copolymerizing the ethylenically unsaturated monomers, including a beta-hydroxy monomer, where peroxide or azo catalysts initiate copolymerization of the monomer double bonds. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate. Other ethylenically unsaturated monomers containing carbon-to-carbon unsaturation include vinyl monomers, allylic monomers and acrylamide monomers. Vinyl esters include vinyl acetate, vinyl propionate, vinyl butyrates, vinyl benzoates, vinyl isopropyl acetates, and similar vinyl esters. Vinyl halides includes vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexyl as well as conjugated dienes such as butadiene, methyl-2-butadiene, 1,3-piperylene, 2,3-dimethyl butadiene, isoprene, cyclopentadiene, and dicyclopentadiene. Vinyl alkyl ethers include methyl vinyl ether, isopropyl vinyl ether, n-butyl vinyl ether, and isobutyl vinyl ether. High levels of carboxyl functional monomers should be avoided. The number average molecular weight of suitable beta-hydroxy ester addition polymers covers the range of values typically obtained for such latexes, which are usually between 10,000 and 1,000,000.

One a weight basis, the functionally reactive beta-hydroxy addition copolymer consists of copolymerized ethylenic monomers comprising between 1% and 50% beta-hydroxyl ester monomer with the balance being other ethylenically unsaturated monomers other than amine monomers. Preferred beta-hydroxy copolymers are acrylic copolymers containing between 1% and 99% acrylic monomer with preferred beta-hydroxy ester acrylic copolymers comprising between 5% and 30% beta-hydroxy ester monomer, between 70% and 95% acrylic monomer, with the balance being other ethylenic monomers which are inert to the curing reaction In accordance with this invention, the beta-hydroxy ester addition polymer is substantially free of copolymerized ethylenically unsaturated amino compounds. Examples of excluded ethylenically unsaturated basic amino compounds are aminoalkyl esters of acrylic and/or methacrylic acid such as the aminomethyl, aminoethyl, aminopropyl, aminobutyl and aminohexyl esters, N-aminoalkyl acrylamides or methacrylamides, such as aminoethylacrylamide, 1-aminoethyl-2-acrylamide, 1-aminopropyl-2-methacrylamide, N-1-(N-butylamino) propyl-(3)-acrylamide and 1-aminohexyl-(6)-acrylamide and 1-(N,N,-dimethylamino)-ethyl-(2)-methacrylamide, 1-(N,N-dimethylamino)-propl-(3)-acrylamide and 1-(N,N-dimethylamino)-hexyl-(6)-methacrylamide.

In accordance with the process of this invention, the beta-hydroxy ester addition copolymer is produced by emulsion copolymerization of the ethylenically unsaturated monomers is an aqueous polymerization medium to produce resulting beta-hydroxy ester functional emulsion polymer (latex). The emulsion polymer of this invention specifically contains beta hydroxy ester groups, but not amine groups, and is adapted to be self-curing between internal hydroxyl groups and internal beta-ester groups. Amine groups block reactivity, inhibit the cure, and render the process of this invention inoperative. In accordance with the process of this invention, the ion-exchange process for removing undesirable cations from the polymeric binder can be utilized in conjunction with specific opacified pigments substantially free of cations or cationic surface treatment. The self-curing polymeric binder is treated with an ion-exchange resin to remove undesirable cations from the polymeric binder. Post ion-exchange treatment is best effected with protonated cation exchange resin. Protonated cations exchange resin typically comprises crosslinked macroreticular polystyrene beads having sulfonic acid surface groups, that is, the beads have a sulfonated surface. Bead sizes are typically about 1 millimeter in diameter more or less. In the present invention, the coating is not externally catalyzed, but is brought into intimate contact with a protonated cation exchange resin, such as Amberlite 200 CH from Rohm and Haas. This contact can be effected by adding from 1%-100% by weight of the exchange resin to the coating with agitation and mixing until the pH has stabilized below 2.5, and typically around 1.2-1.8. The mixture can be strained through a filter medium such as linen cloth of a size small enough to remove all of the solid exchange resin, whereby the filtered coating exhibits no changes in pH or viscosity over 3 months or longer. The coating can be passed over a column bed of the exchange resin at a rate which yields a coating pH of less than 2.5, preferably around 1.2-1.8. The ionexchange imparts no change in stability or in pH or viscosity over a 3-month period.

In practice, the ethylenic monomers can be polymerized in an aqueous medium at a pH preferably between about 1.0 and 6 to form a self-curing emulsion polymer having a pH above 2.5. Generally, the polymerization is conducted at a temperature of about 20°-100° C. in the presence of a free radical generating initiator. Commonly used free radical initiators include various peroxygen compounds such as the persulfates, benzoyl peroxide, t-butyl hydroperoxide, cumene hydroperoxide, di-t-butyl perphthalate, pelargonyl peroxide and 1-hydroxycyclohexyl hydroperoxide. Particularly preferred as polymerization initiators are the water-soluble peroxygen compound such as hydrogen peroxide and the sodium, potassium and and ammonium persulfates used by themselves or in activated "redox" type systems. Typical "redox" systems include alkali metal persulfates with a reducing substance such as a polyhydroxy phenol. The amount of initiator used will generally be in the range between about 0.1 to 3% by weight based on the monomers. Usually the initiator will all be charged at the outset of the polymerization, although incremental addition or proportioning of the initiator can be often employed.

Emulsifiers used to prepare the latices of this invention are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate, ethanol-amine lauryl sulfate, ethylamide lauryl sulfate; alkali metal and ammonium salts of sulfonated petroleum or paraffin oils, sodium salts of aromatic sulfonic acids, such as dodecane-1-sulfonic acid and octadiene-1-sulfonic acid; aralkylsulfonates such as sodium ispropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used can be from about 0.01 to 6% or more by weight of the monomers. All of the emulsifier may be added at the beginning of the polymerization or may be added incrementally or by proportioning throughout the run. Typical polymerizations for the preparation of the emulsion polymers of this invention are conducted by charging the monomers into the polymerization reactor which contains water and a portion of the emulsifying agent. The reactor and its contents are heated and the initiator added.

A pigmented coating can be prepared by blending the emulsion with cation-free opacifying pigments. Cation-free opacifying pigments contain less than about 0.5% by weight residual aluminum and preferably are essentially free of cations including aluminum cations. A uniform dispersion of pigments can be obtained, using conventional anionic and nonionic surfactants. The resulting self-curing emulsion polymer is stable and shows no flocculation over extended periods of time. Accordingly, a stable dispersion can be made using conventional surfactants which subsequently can be acidified by cation exchange to provide compatibility and stability in let down steps and pigment grinds if desired. Conventional basic surfactant can be used as the dispersant to enable a dilatentfree pigment grind. Cation exchange prevents settling and flocculation and further prevents cure inhibition in the final paint.

The following examples, wherein percentages are by weight, further illustrate the merits of this invention.

EXAMPLE 1

Preparation of Latexes

Four latexes, A, B, C, and D containing 6, 12, 18, and 24% 2-hydroxy ethyl acrylate. They were made by conventional polymerization techniques, with common surfactants. The only differences were in the monomer ratios; all were made to a theoretical Fox Tg of 10° C.

| Material | Latex A Grams | Latex B Grams | Latex C Grams | Latex D Grams |
| --- | --- | --- | --- | --- |
| D.I. water | 2000 | 2000 | 2000 | 2000 |
| Anionic Surfactant #1 | 6.0 | 6.0 | 6.0 | 6.0 |
| Persulfate Initiator | 5.0 | 5.0 | 5.0 | 5.0 |
| Butyl Acrylate | 763 | 695 | 626 | 556 |
| Methyl Methacrylate | 923 | 886 | 846 | 808 |
| 2-hydroxyethyl acrylate | 108 | 216 | 324 | 432 |
| Methacrylic Acid | 4.0 | 4.0 | 4.0 | 4.0 |
| Anionic Surfactant #2 | 6.0 | 6.0 | 6.0 | 6.0 |

These latexes will be referred to as latexes A, B, C, and D.

EXAMPLE 2

Cation Exchange of Latexes

A 100 gram sample of each latex was put in a container with a stirrer and pH probe. With mixing, Amberlite 200 CH protonated cation exchange resin (Rohm and Haas) was added in two increments to assure complete removal of cations from the latex.

| Latex | Initial pH | +Gms. 200 CH | Intermed. pH | +Gms. 200 CH | Final pH |
| --- | --- | --- | --- | --- | --- |
| A | 2.6 | 30.2 | 1.8 | 15.0 | 1.8 |
| B | 2.6 | 27.6 | 1.8 | 20.0 | 1.8 |
| C | 2.6 | 27.0 | 1.7 | 22.0 | 1.8 |
| D | 2.6 | 27.0 | 1.7 | 15.0 | 1.7 |

EXAMPLE 3

Evaluation of Cure

Samples of each latex before and after exchange were applied side-by-side onto smooth glass plates, using a 3-mil Bird coater. Each plate, containing the as is (non-exchanged) and exchanged pair of films, was placed in a 250° F. hot air over for 5 minutes, then removed and cooled to room temperature. Degree of cure was measured by rubbing the cured films with a rag saturated with methyl ethyl ketone. Failure was determined when the film ruptured. Triplicate determinations were made in each case, and the average is reported in each case.

| Latex | MEK Rubs, As is | MEK Rubs, Exchanged |
| --- | --- | --- |
| A | 12 | 30 |
| B | 11 | 208 |
| C | 14 | >400 |
| D | 18 | >400 |

EXAMPLE 4

Room Temperature Cure

Samples of latex D, as is (non-exchange) and after exchange, were applied to a glass plate with the 3-mil Bird coater and allowed to dry at room temperature (approximately 70° F.). Cure was checked by methyl ethyl ketone resistance at several times after application.

| Day Time | MEK Rubs, As is | MEK Rubs, Exchanged |
| --- | --- | --- |
| 18 hours | 13 | 23 |
| 7 days | 12 | 118 |
| 8 days | 14 | 227 |

EXAMPLE 5

Acid Catalysis

Samples of latex B were catalyzed with 0.55% by weight and 3.0% by weight of a 40% solution of p-toluene sulfonic acid in isopropanol. They were applied as above and cured for 5 minutes at 250° F. before checking for resistance to methyl ethyl ketone.

| % p-TSA Solution | pH Exchanged | pH Catalyzed | MEK Rubs Exchanged | MEK Rubs Catalyzed |
| --- | --- | --- | --- | --- |
| 0.55% | 1.76 | 1.71 | 237 | 23 |
| 3.0% | 1.76 | 1.15 | 301 | 37 |

For reference, note that the uncatalyzed, unexchanged control exhibits a consistent 10–15 MEK rubs, indicating that the acid catalyst causes some cure, but far less than the cation exchange process.

Accordingly, a latex containing more than 6% HEA and up to at least 24% HEA, when cation-exchanged, exhibits excellent self cure when baked 5 minutes at 250° F. on glass. Room temperature cure beings after 1 day and a fast, thermosetting reaction results. A major advantage is that the cure proceeds without any formaldehyde-containing monomers whereby this invention provides a 1-package stable, room-temperature curing, formaldehyde-free latex paint.

Although preferred aspects of this invention have been described and illustrated by examples, the scope of the invention is not intended to be limited except by the appended claims.

We claim:
1. In a process for producing an ambient dry painted substrate, including the step of producing an emulsion polymer binder by copolymerizing ethylenically unsaturated monomers in an aqueous polymerization medium, and in the presence of surfactants and initiators, the improvement comprising:
   compolymerizing ethylenically unsaturated monomers, including beta-hydroxy ester monomer, but excluding amine monomers, to produce a functionally reactive, self-curing emulsion polymer con- taining pendant beta-hydroxy ester chains, where the functionally reactive emulsion polymer copolymerized monomers comprising on a weight basis between 1% and 50% beta-hydroxyl ester monomers, between 1% and 99% acrylic monomer, with the balance being other ethylenically unsaturated monomers which are in ert to the curing reaction as defined below treating the functionally reactive emulsion polymer by contact with an ion exchange resin to remove cations from the functional emulsion polymer and produce a pH less than about 2. 5, where said functionally reactive emulsion polymer is adapted to be self-curing by transesterification reaction between hydroxyl groups and beta-ester groups on said pendant beta-hydroxy ester chains upon application of said paint coating to a substrate; and applying the paint coating to a substrate and coalescing the coating into a film and at ambient temperature curing the film by self-crosslinking the hydroxyl groups and the beat-ester groups on said beta-hydroxy ester chains on the self-curing emulsion polymer.

2. The process in claim 1 wherein the paint coating applied to the substrate is crosslinked by transesterification at ambient room temperature.

3. The process in claim 1 wherein the paint coating applied to the substrate is crosslinked by transesterification at temperatures above ambient room temperature.

4. The process in claim 1 wherein the ion-exchange step reduces the pH to between about 1.2 and 1.8.

5. The process in claim 1 wherein the functionally reactive emulsion polymer consists of copolymerized monomers comprising on a weight basis between 5% and 30% beta-hydroxy ester monomer, between 70% and 95% acrylic monomer, with the balance being other ethylenic monomers.

* * * * *